United States Patent Office 3,226,435
Patented Dec. 28, 1965

3,226,435
NOVEL 7,11a-DIHALOTETRACYCLINES AND THE PROCESS OF PREPARING THEM
Jerry Robert Daniel McCormick, Spring Valley, Robert Winterbottom, New City, and Panayota Bitha, New York, N.Y., assignors to American Cyanamid Company, Stamford, Conn., a corporation of Maine
No Drawing. Filed Dec. 26, 1962, Ser. No. 247,266
6 Claims. (Cl. 260—559)

This invention relates to new 11a-halogenated tetracycline compounds and processes for the preparation thereof. More particularly, the present invention is concerned with a novel process for the direct 11a-halogenation of 7-halotetracyclines, the intermediates obtained thereby, and the conversion of said intermediates to the corresponding 5a(11a)-dehydrotetracyclines. It is also intended to include salts of the 11a-halogenated 7-halotetracyclines with both acids and bases and, in particular, mineral acid salts and alkali metal and alkaline earth metal salts. The novel compounds of the present invention may be represented by the following general formula:

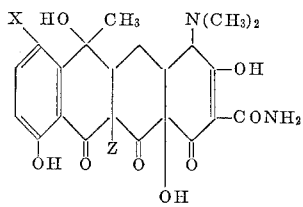

wherein X is chlorine or bromine and Z is chlorine, bromine, or iodine.

The novel 7,11a-dihalotetracyclines of the present invention may be prepared by a process which consists of merely contacting 7-chlorotetracycline or 7-bromotetracycline, or mineral salts thereof, with a halogenating agent in a reaction-inert organic solvent. Suitable halogenating agents include bromine; chlorine; iodochloride; iodobromide; N-halo lower alkanoic acid amides, e.g. N-chlor- and N-bromacetamide; N-halo dicarboxylic acid imides, e.g. N-chloro-, N-bromo- and N-iodosuccinimide; N-halo lower alkanoyl anilines, e.g. N-bromoacetanilide, N-chloropropionanilide and the like; 3-chloro-, 3-bromo-, 3,5-dichloro- and 3,5-dibromo-5,5-dimethyl-hydantoin; pyridinium perbromide hydrobromide and pyridinium perchloride hydrochloride; and lower alkyl hypochlorites, e.g. tertiary butylhypochlorite. It is obvious that, in general, any halogenating agent commonly employed in the art is operable, but the above are preferred. Best results are obtained if at least an equimolar amount of the halogenating agent is employed.

By "reaction-inert solvents" as employed herein is meant a solvent which, under the conditions of the reaction, does not react in an undesired manner with either starting compounds or final products. A minimum of laboratory experimentation will permit the selection of suitable solvents for the present process. Exemplary of such solvents are dioxane, acetic acid, tetrahydrofuran, carbon tetrachloride, chloroform, the dimethyl ether of diethylene glycol (diglyme) or the dimethyl ether of ethylene glycol (monoglyme).

Reaction temperature does not appear to be critical in the present process since the reaction is initiated even at room temperature and at lower temperatures on contacting the reagents. The use of higher temperatures merely serves to ensure completeness of the reaction and shorten the time required. The use of temperatures higher than about 100° C. provides no appreciable advantage and should be avoided since it may result in decreased yield of the desired product. At room temperature, the reaction is complete in as little as 3 to 30 minutes. Of course, the reaction time will depend on the amounts of materials employed, large-scale preparations requiring longer periods than laboratory scale.

After the reaction is complete, the 7,11a-dihalotetracyclines are obtained by conventional procedures of isolation. One such procedure involves the dilution of the reaction mixture with a non-solvent, e.g. ether, after which the separated product is collected. The products as obtained are usually of sufficient purity but, if desired, they may be recrystallized from suitable solvents such as lower alkanols.

The 7,11a-dihalotetracyclines of the present invention are useful as intermediates for the preparation of the corresponding 7-halo-5a(11a)dehydrotetracyclines. The 5a(11a)dehydrohalogenation of the 7,11a-dihalotetracyclines of the present invention is not to be confused with the simple removal of the 11a-halogen. The simple removal of the 11a-halogen is accomplished by conventional procedures such as treatment of the 11a-halotetracyclines with (a) dilute aqueous hydriodic acid, (b) zinc metal in the presence of acetic acid, and (c) metal sulfites and hydrosulfites. The 5a(11a)-dehydrohalogenation of the 7,11a-dihalotetracyclines of the present invention is accomplished by heating the 7,11a-dihalotetracycline in a reaction-inert organic solvent. Somewhat increased yields are obtained if about one molar equivalent of the catalyst such as lithium chloride or a tetraalkyl ammonium halide is employed. Suitable tetraalkyl ammonium halide catalysts for the 5a(11a)-dehydrohalogenation may be, for example, tetramethyl ammonium iodide, trimethylethyl ammonium chloride, tetraethyl ammonium bromide, and the like. Suitable reaction-inert organic solvents are acetonitrile, dioxane, tetrahydrofuran, monoglyme, diglyme and the like although acetonitrile is preferred. The 5a(11a)-dehydrohalogenation may be carried out at temperatures ranging from about 50° C. to about 100° C. and usually proceeds to completion over a period of several hours. After the reaction is complete, the product is obtained by standard procedures. Usually the 7-halo-5a(11a) - dehydrotetracycline hydrohalide precipitates from the solution directly and is conveniently collected by filtration. The product may also be isolated by dilution of the reaction mixture with a non-solvent, e.g. hexane, heptane, ether, and the like, which also results in precipitation of the product.

The invention will be described in greater detail in conjunction with the following specific examples.

EXAMPLE 1

*Preparation of 7,11a-dichlorotetracycline from 7-chlorotetracycline*

To a suspension of 8.8 gm. of 7-chlorotetracycline neutral in 48 ml. of glacial acetic acid was added a suspension of 2.75 gm. of N-chlorosuccinimide in 44 ml. of acetic acid. Essentially complete solution was effected after stirring for 3 minutes. The solution was stirred for an additional 1 minute and was then filtered. A total of 100 ml. of Skellysolve C was added to the clear filtrate and the resulting two phases were separated. To the lower phase was added 200 ml. of ether with stirring and the resulting product was filtered, washed with three 8 ml. portions of ether, and then dried in vacuo at 35° C. for 16 hours. The yield was 5.3 gm. of product (7,11a-dichlorotetracycline) representing 56.2% of the starting material.

EXAMPLE 2

*Conversion of 7,11a-dichlorotetracycline to 7-chloro-5a,11a-dehydrotetracycline*

A solution of 16 gm. of 7,11a-dichlorotetracycline, obtained as described in Example 1, and 6.6 gm. of tetraethylammonium bromide in 1580 ml. of acetonitrile was stirred for 4 hours at 65° C. and then for 1 hour at room temperature. The resulting yellow crystalline material was filtered off, washed with two 15 ml. portions of cold acetonitrile, and then dried in vacuo at 40° C. for 16 hours yielding 7 gm. (43.6%) of 7-chloro-5a,11a-dehydrotetracycline hydrochloride.

EXAMPLE 3

*Preparation of 11a-bromo-7-chlorotetracycline from 7-chlorotetracycline*

To a solution of 479 mg. of anhydrous 7-chlorotetracycline in 15 ml. of dry tetrahydrofuran was added 454 mg. of N-bromoacetamide in 6 ml. of the same solvent. The mixture was stirred at room temperature for 15 minutes and was then added in a slow stream to 530 ml. of stirred heptane. The resulting precipitate was collected, washed with heptane, and dried to afford tan colored 11a-bromo-7-chlorotetracycline.

EXAMPLE 4

*Conversion of 11a-bromo-7-chlorotetracycline to 7-chloro-5a,11a-dehydrotetracycline*

To a solution of 2 gm. of 11a-bromo-7-chlorotetracycline in 200 ml. of dry acetonitrile was added 0.755 gm. of tetraethylammonium bromide. The stirred solution was heated for four hours at 65° C. and was then cooled to room tempearture. The resulting precipitate was collected, washed with a little acetonitrile and ether, and then dried in vacuo to give pure 7-chloro-5a,11a-dehydrotetracycline.

EXAMPLE 5

*Preparation of 7-bromo-11a-chlorotetracycline from 7-bromotetracycline*

A partial suspension of 0.523 gm. of anhydrous 7-bromotetracycline in 20 ml. of dried dioxanes was treated with 0.146 gm. of N-chlorosuccinimide in 5 ml. of dioxane. All of the material went into solution and the reaction was completed after stirring for 10 minutes. The reaction mixture was added slowly to 250 ml. of stirred heptane and the resulting precipitate was collected, washed with heptane, and then dried in vacuo to afford amorphous 7-bromo-11a-chlorotetracycline.

EXAMPLE 6

*Conversion of 7-bromo-11a-chlorotetracycline to 7-bromo-5a,11a-dehydrotetracycline*

Treatment of 3.3 gm. of 7-bromo-11a-chlorotetracycline with 0.93 gm. of tetramethylammonium bromide in 315 ml. of dry acetonitrile, as described in Example 2, afforded 7-bromo-5a,11a-dehydrotetracycline.

What is claimed is:

1. The process for the 5a(11a)-dehydrohalogenation of a 7,11a-dihalotetracycline which comprises heating said 7,11a-dihalotetracycline in a reaction-inert solvent at a temperature of from about 50° C. to about 100° C.

2. The process for the 5a(11a)-dehydrochlorination of 7,11a-dichlorotetracycline which comprises heating said 7,11a-dichlorotetracycline in a reaction-inert solvent at a temperature of from about 50° C. to about 100° C.

3. The process for the 5a(11a)-dehydrobromination of 7-chloro-11a-bromotetracycline which comprises heating said 7-chloro-11a-bromotetracycline in a reaction-inert solvent at a temperature of from about 50° C. to about 100° C.

4. The process for the 5a(11a)-dehydrohalogenation of a 7,11a-dihalotetracycline which comprises heating said 7,11a-dihalotetracycline with about one molar equivalent of a tetraalkyl ammonium halide in a reaction-inert solvent at a temperature of from about 50° C. to about 100° C.

5. The process for the 5a(11a)-dehydrochlorination of 7,11a-dichlorotetracycline which comprises heating said 7,11a-dichlorotetracycline with about one molar equivalent of a tetraalkyl ammonium halide in a reaction-inert solvent at a temperature of from about 50° C. to about 100° C.

6. The process for the 5a(11a)-dehydrobromination of 7-chloro-11a-bromotetracycline which comprises heating said 7-chloro-11a-bromotetracycline with about one molar equivalent of a tetraalkyl ammonium halide in a reaction-inert solvent at a temperature of from about 50° C. to about 100° C.

References Cited by the Examiner

UNITED STATES PATENTS

| | | | |
|---|---|---|---|
| 3,013,075 | 12/1961 | Boothe et al. | 260—559 |
| 3,036,129 | 5/1962 | Hlavka et al. | 260—559 |
| 3,043,875 | 7/1962 | Beereboom et al. | 260—559 |
| 3,109,007 | 10/1963 | Blackwood et al. | 260—559 |

NICHOLAS S. RIZZO, *Primary Examiner.*